(12) United States Patent
Chien et al.

(10) Patent No.: US 11,170,734 B2
(45) Date of Patent: Nov. 9, 2021

(54) ELECTRONIC DEVICE AND COLOR PROFILE ADJUSTMENT METHOD

(71) Applicant: Acer Incorporated, New Taipei (TW)

(72) Inventors: Ming-Yu Chien, New Taipei (TW); Ling-Fan Tsao, New Taipei (TW); Hsin-Yu Chen, New Taipei (TW); Jun-Liang Lu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/837,402

(22) Filed: Apr. 1, 2020

(65) Prior Publication Data

US 2021/0201846 A1     Jul. 1, 2021

(30) Foreign Application Priority Data

Dec. 30, 2019   (TW) .................................. 108148344

(51) Int. Cl.
  *G09G 5/02*     (2006.01)
  *G06F 3/14*     (2006.01)
  *G06F 3/0484*   (2013.01)

(52) U.S. Cl.
  CPC ......... *G09G 5/026* (2013.01); *G06F 3/04842* (2013.01); *G06F 3/1423* (2013.01); *G09G 2320/0242* (2013.01); *G09G 2320/0693* (2013.01)

(58) Field of Classification Search
  CPC .......... G09G 5/026; G09G 2320/0242; G09G 2320/0693; G06F 3/04842; G06F 3/1423
  See application file for complete search history.

(56) References Cited

U.S. PATENT DOCUMENTS

| 2011/0249015 | A1* | 10/2011 | Lonkar | G06F 3/1431 |
| | | | | 345/589 |
| 2014/0104304 | A1* | 4/2014 | Jaynes | H04N 9/3147 |
| | | | | 345/600 |

* cited by examiner

*Primary Examiner* — Lisa S Landis
(74) *Attorney, Agent, or Firm* — McClure, Qualey & Rodack, LLP

(57) ABSTRACT

A color profile adjustment method adapted to an electronic device includes: obtaining a first current color profile of a first screen which is externally connected to the electronic device; determining whether the first current color profile is the same as a second current color profile of a second screen of the electronic device; and when it is determined that the first current color profile is different than the second current color profile, outputting an adjustment command to the first screen, so that the first screen adjusts the first current color profile according to the adjustment command.

8 Claims, 11 Drawing Sheets

ELECTRONIC DEVICE AND COLOR PROFILE ADJUSTMENT METHOD

CROSS REFERENCE TO RELATED APPLICATIONS

This Application claims priority of Taiwan Patent Application No. 108148344, filed on Dec. 30, 2019, the entirety of which is incorporated by reference herein.

BACKGROUND OF THE INVENTION

Field of the Invention

The present invention relates to the technology of color profile adjustment, and more particularly to an electronic device and a color profile adjustment method that can adjust the color profile of a screen externally connected to the electronic device according to the color profile of a screen of the electronic device.

Description of the Related Art

In recent years, with the rapid spread of electronic technology, members of the general public must interact with a wide variety of electronic devices in their daily lives. Furthermore, in order to facilitate human-computer interaction, such as that between a user and an electronic device, most electronic devices are equipped with a built-in screen or are connected to a main screen in external.

However, no matter whether the electronic device uses a built-in screen or is connected to a main screen, the screen will have a fixed size. Therefore, for users who need to use and watch multiple windows at the same time, a single screen would be insufficient to meet their needs.

BRIEF SUMMARY OF THE INVENTION

A color profile adjustment method is disclosed in an embodiment of the present invention. The color profile adjustment method includes: obtaining a first current color profile of a first screen which is externally connected to an electronic device; determining whether the first current color profile is the same as a second current color profile of a second screen of the electronic device; and when it is determined that the first current color profile is different than the second current color profile, outputting an adjustment command to the first screen, so that the first screen adjusts the first current color profile according to the adjustment command.

An electronic device is disclosed in an embodiment of the present invention. The electronic device includes a connection port, a second screen and a processing module. The connection port is used to connect to a first screen in the external of the electronic device. The processing module is used to obtain a first current color profile of the first screen when the first screen is externally connected to the connection port, and to determine whether the first current color profile is the same as a second current color profile of the second screen. When it is determined that the first current color profile is different than the second current color profile, the processing module outputs an adjustment command to the first screen through the connection port, so that the first screen adjusts the first current color profile according to the adjustment command.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the above objects, features and advantages of the embodiments of the present invention easier to understand, a detailed description is given in the following embodiments with reference to the accompanying drawings.

It should be understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
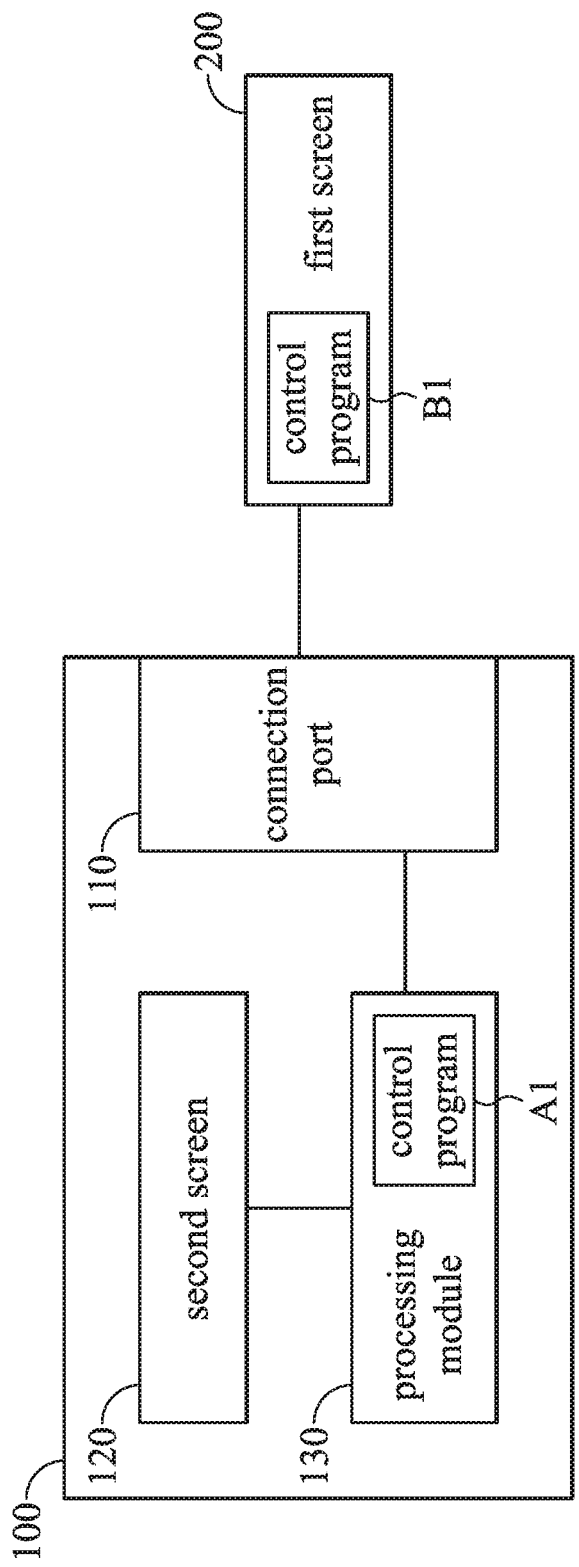
FIG. 1 is a block diagram illustrating an embodiment of the electronic device.

FIG. 1 is a block diagram illustrating an embodiment of the electronic device. Please refer to FIG. 1. In order to clarify the concept of the invention, it should be noted that FIG. 1 presents a simplified block diagram, in which only the elements relevant to the invention are shown. It will be readily appreciated by persons with ordinary skill in the art that the electronic device can certainly comprise other elements to provide specific functions.

An electronic device 100 may include a screen to display images for the user to view. In some embodiments, the screen herein can build in the electronic device 100. For example, a laptop equipped with a built-in screen. However, the present invention is not limited thereto. In other embodiments, the screen herein can also be connected to the electronic device 100 through external wire. For example, a host and a screen (or it can be referred to as main screen) of a desktop computer. Furthermore, in addition to the original built-in screen (or the main screen, hereinafter they are collectively referred to as a second screen 120), the electronic device 100 can further externally connect to at least one screen (it can be referred to as external screen or secondary screen, hereinafter they are collectively referred to as a first screen 200), so as to satisfy the requirement that multiple screens be available to the user.

In an embodiment, the electronic device 100 may include at least one connection port 110, a second screen 120 and a processing module 130. Furthermore, the processing module 130 is coupled to each connection port 110 and the second screen 120. It should be noted that although FIG. 1 only shows one connection port 110 and one first screen 200 connected to the connection port 110, the number of connection ports 110 and the number of first screens 200 are not intended to limit the present invention.

Each connection port 110 is configured to connect the first screen 200 in the external of the electronic device 100, so that the electronic device 100 can provide multiple display screens for the user to use. In some implementations, the connection port 110 can be realized by a HDMI (High Definition Multimedia Interface), DVI (Digital Visual Interface), VGA (Video Graphics Array) or any other interface suitable for image transmission.

The processing module 130 can perform any one embodiment of color profile adjustment method of the present invention. In some implementations, the functions and actions of the processing module 130 can be realized by a processor, such as SOC (System On Chip), CPU (Central Processing Unit), MCU (Microcontroller), ASIC (Application Specific Integrated Circuit), AP (Application Processor), DSP (Digital Signal Processor), etc., to execute corresponding programs, but the present invention is not limited thereto.

Figure 2:
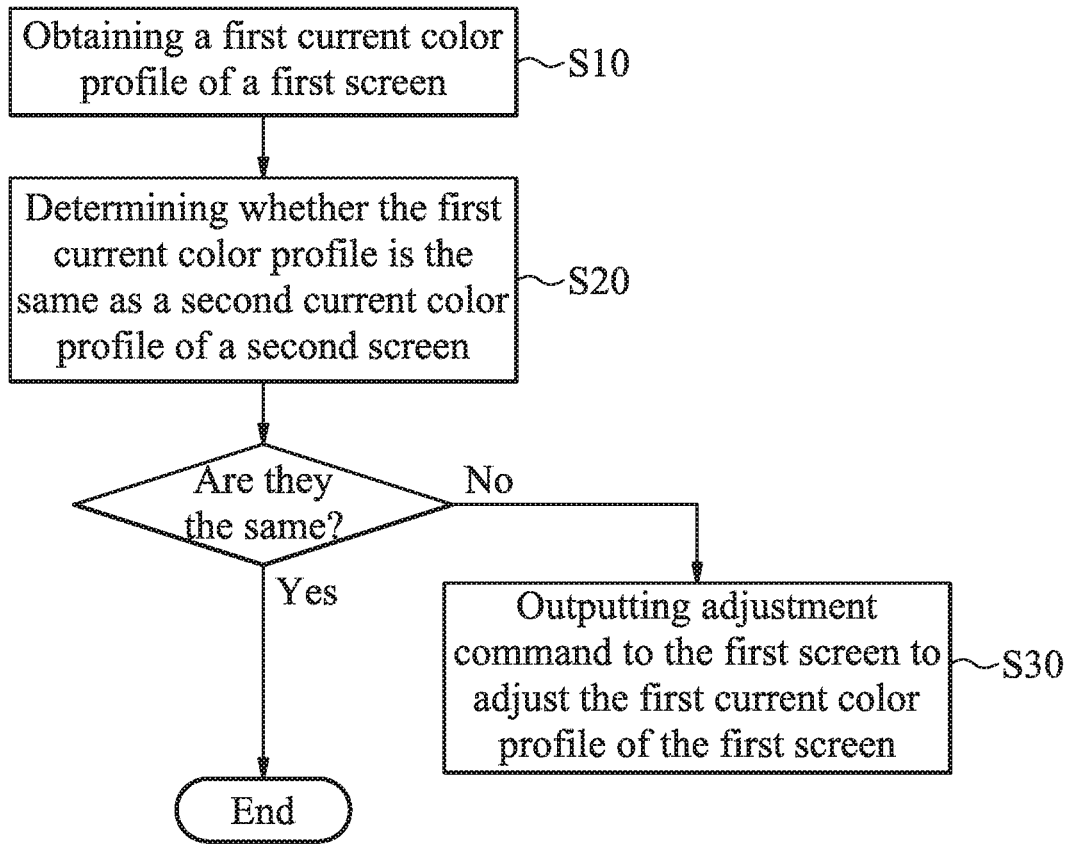
FIG. 2 is a flowchart illustrating an embodiment of the color profile adjustment method.

FIG. 2 is a flowchart illustrating an embodiment of the color profile adjustment method. Please refer to FIG. 1 and FIG. 2. In an embodiment of the color profile adjustment method, the processing module 130 can obtain a first current color profile of the first screen 200 through the connection port 110 (step S10), and determine whether the first current color profile of the first screen 200 is the same as a second current color profile of the second screen 120 (step S20). When the processing module 130 determined that the first current color profile of the first screen 200 is different than the second current color profile of the second screen 120, the processing module 130 can generate an adjustment command according to the second current color profile of the second screen 120 and outputs the adjustment command to the first screen 200, so that the first screen 200 can adjust the first current color profile according to the adjustment command (step S30). In this way, the first screen 200 externally connected to the electronic device 100 can use a color configuration consistent with the second screen 120 of the electronic device 100 to operate a display, so as to optimize user experience.

In some implementations, the first current color profile or the second current color profile may be sRGB, AdobeRGB, ECO, HDR, DCI-P3, Movie, Graphic, CAD/CAM, Reading, Standard, or any other suitable color profile, but the present invention is not limited thereto.

Figure 3:
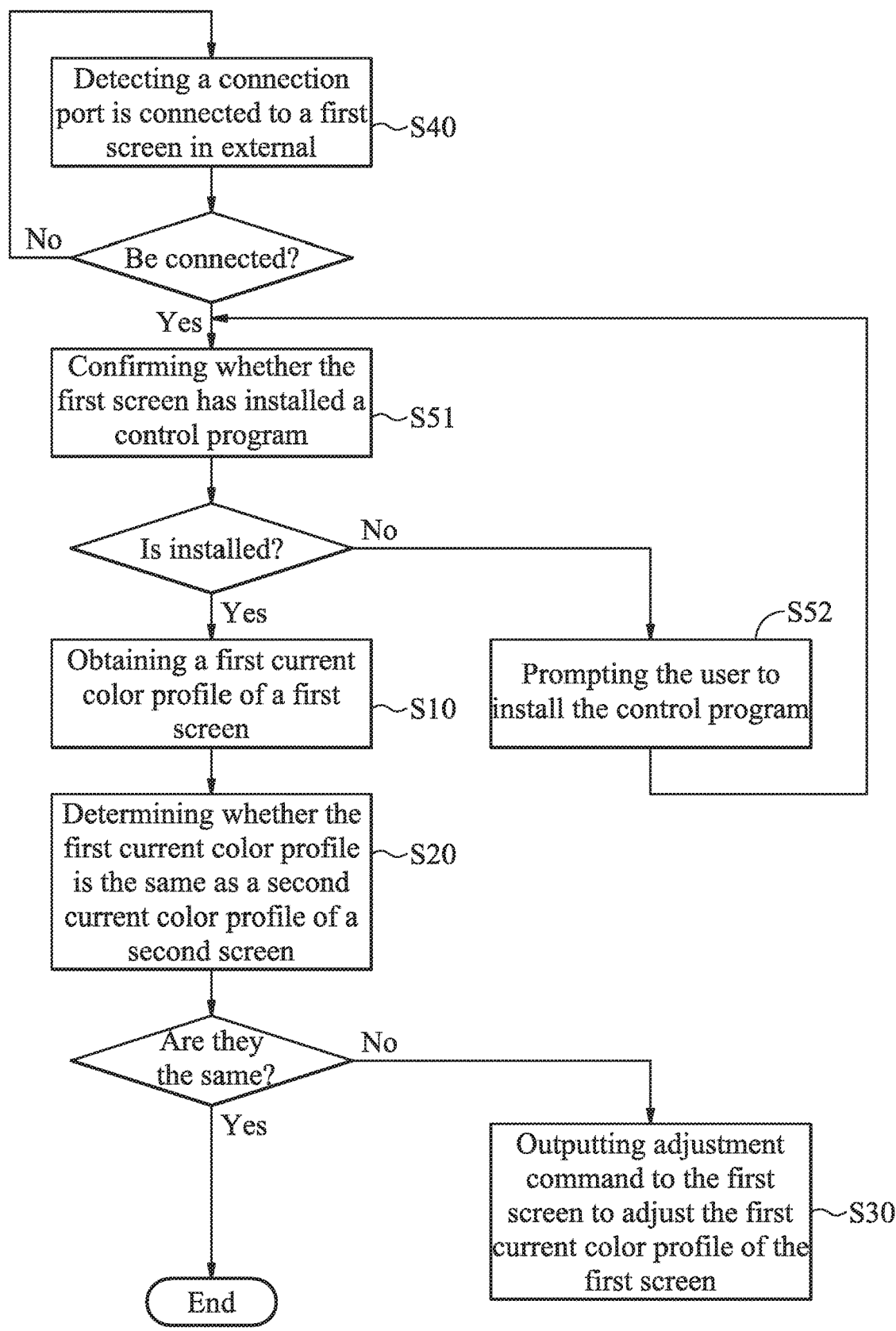
FIG. 3 is a flowchart illustrating an embodiment of the color profile adjustment method.

FIG. 3 is a flowchart illustrating an embodiment of the color profile adjustment method. Please refer to all the figures form FIG. 1 to FIG. 3. In some embodiments, before step S10, the processing module 130 can detect each connection port 110 to confirm whether any connection port 110 is externally connected to a first screen 200 (step S40). Furthermore, the processing module 130 can continue subsequent steps, such as step S10, after detected that the connection port 110 is connected to the first screen 200.

In some embodiments, the electronic device 100 may further include a control program A1, and the processing module 130 can control the second screen 120 by the execution of the control program A1. The first screen 200 may include a control program B1, and the control program B1 is configured to control the first screen 200. Furthermore, the electronic device 100 can realize any one embodiment of the color profile adjustment method of the present invention through the communication between the control program A1 and the control program B1.

In an embodiment of the color profile adjustment method, when the processing module 130 in step S40 detects that the connection port 110 is externally connected to the first screen 200, the processing module 130 can further confirm whether the first screen 200 has installed a control program B1 through the connection port 110 (step S51). When the processing module 130 determines that the first screen 200 has installed the control program B1, the processing module 130 then continues the subsequent steps, such as step S10. When the processing module 130 determines that the first screen 200 does not install the control program B1, the processing module 130 can further prompt the user to install the control program B1 before using by popping up an installation message on the first screen 200 and/or the second screen 120 (step S52).

Figure 4:
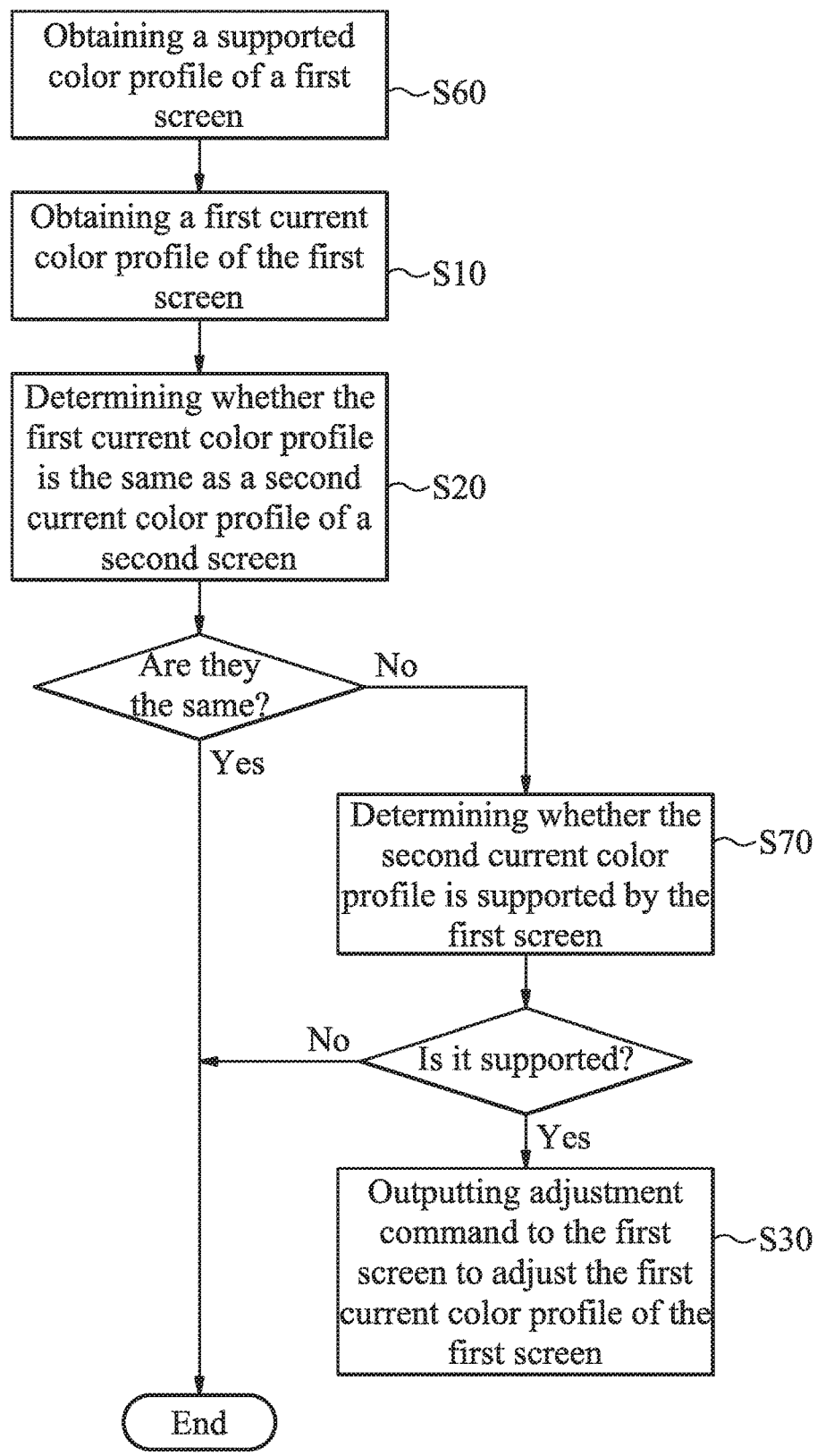
FIG. 4 is a flowchart illustrating an embodiment of the color profile adjustment method.

FIG. 4 is a flowchart illustrating an embodiment of the color profile adjustment method. It should be noted that although step S40, step S51, and step S52 are not shown in FIG. 4, step S40, step S51, and step S52 may be combined into the flow shown in FIG. 4. Please refer to FIG. 1 and FIG. 4. In an embodiment of the color profile adjustment method, before step S30, the processing module 130 can further obtain a supported color profile of the first screen 200 through the communication between the control program A1 and the control program B1 (step S60), so as to know what color profiles are supported by the first screen 200. After obtained the supported color profile of the first screen 200 and the second current color profile of the second screen 120, the processing module 130 can determine whether the first screen 200 could support the second current color profile used by the second screen 120 according to the supported color profile obtained in step S60 (step S70).

In some embodiments, the communication between the control program A1 and the control program B1 can be conducted by using a Named Pipe technology to transmit commands with data format for byte array communication, but the present is not limited thereto.

Figure 5:
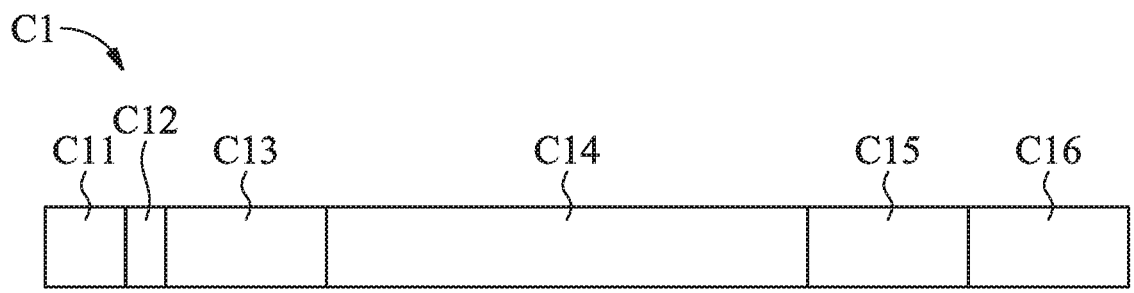
FIG. 5 is a schematic diagram illustrating an embodiment of a command format to obtain a supported color profile.

FIG. 5 is a schematic diagram illustrating an embodiment of a command format to obtain a supported color profile. In an embodiment, an example of a command C1 issued by the processing module 130 in step S60 through the control program A1 may as shown in FIG. 5. Herein, the command C1 may include a plurality of command segments C11-C16 which are sequentially connected. Wherein, the command segment C11 is a command code which is configured to indicate the purpose of this command C1. For example, when the value of the command segment C11 is zero, it may be used to represent that this command C1 is used to obtain a supported color profile. Furthermore, the occupied byte of the command segment C11 may be 2 bytes. The command segment C12 is configured to indicate how many parameters follow it. For example, when the value of the command segment C12 is 2, this indicates that there are two parameters in total following it. Furthermore, the occupied byte of the command segment C12 may be 1 byte. The command segment C13 is configured to indicate an occupied byte of the next command segment. For example, when the value of the command segment C13 is 12, this indicates that the occupied byte of the command segment C14 is 12 bytes. Furthermore, the occupied byte of the command segment C13 may be 4 bytes. The command segment C14 is configured to indicate the module name of the screen to receive this command C1 (herein, it is the module name of the first screen 200). For example, the command segment C14 may include "CP123". The command segment C15 is configured to indicate an occupied byte of the next command segment. For example, when the value of the command segment C15 is 4, this indicates that the occupied byte of the command segment C16 is 4 bytes. Furthermore, the occupied byte of the command segment C15 may be 4 bytes. The command segment C16 is configured to indicate an index value of the screen to receive this command C1. For example, when the command segment C14 is "CP123" and the value of the command segment C16 is 2, this indicates that the first screen 200 to receive this command is the first screen 200 whose module name is "CP123" and the index value is numbered 2, among multiple first screens. It should be noted that the occupied byte of each of the command segments C11-C16 is not limited thereto, it can be determined according to the design.

Figure 6:
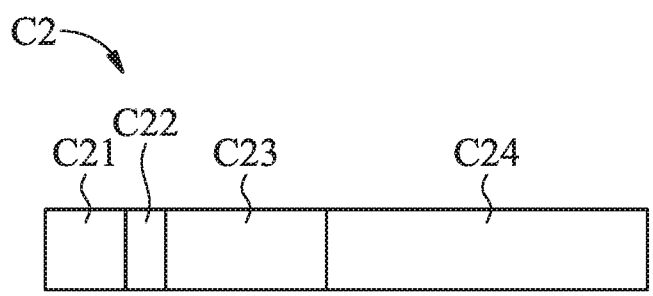
FIG. 6 is a schematic diagram illustrating an embodiment of a command format to respond for the supported color profile.

FIG. 6 is a schematic diagram illustrating an embodiment of a command format to respond for the supported color profile. In an embodiment, an example of a command C2 responded by the control program B1 after receiving and executing the command C1 may be as shown in FIG. 6. Herein, the command C2 may include a plurality of command segments C21-C24 which are sequentially connected. Wherein, the command segment C21 is an error code which is configured to indicate the execution of received command is successful. For example, when the value of the command segment C21 is zero, this indicates that the execution was successful, while other values indicate that the execution has failed. The command segment C22 is configured to indicate how many parameters follow it. For example, when the value of the command segment C22 is 1, this indicates that there is one parameter following it. Furthermore, the occupied byte of the command segment C22 may be 1 byte. The command segment C23 is configured to indicate an occupied byte of the next command segment. For example, when the value of the command segment C23 is 8, this indicates that the occupied byte of the command segment C24 is 8 bytes. The command segment C24 is configured to indicate the supported color profile obtained by the control program B1, and wherein each bit in the command segment C24 represents to different color profile. For example, the command segment C24 may be "11000010", which indicates that a total of three kinds of color profiles supported by the first screen 200 are included in the supported color profile. For example, the bits whose value is "1" in "11000010" sequentially represent to AdobeRGB, HDR, and sRGB, respectively, i.e., three kinds of color profiles supported by the first screen 200 are AdobeRGB, HDR, and sRGB. It should be noted that the color profile represented by each bit in the command segment C24 is not limited thereto and can be determined according to the design.

Figure 7:
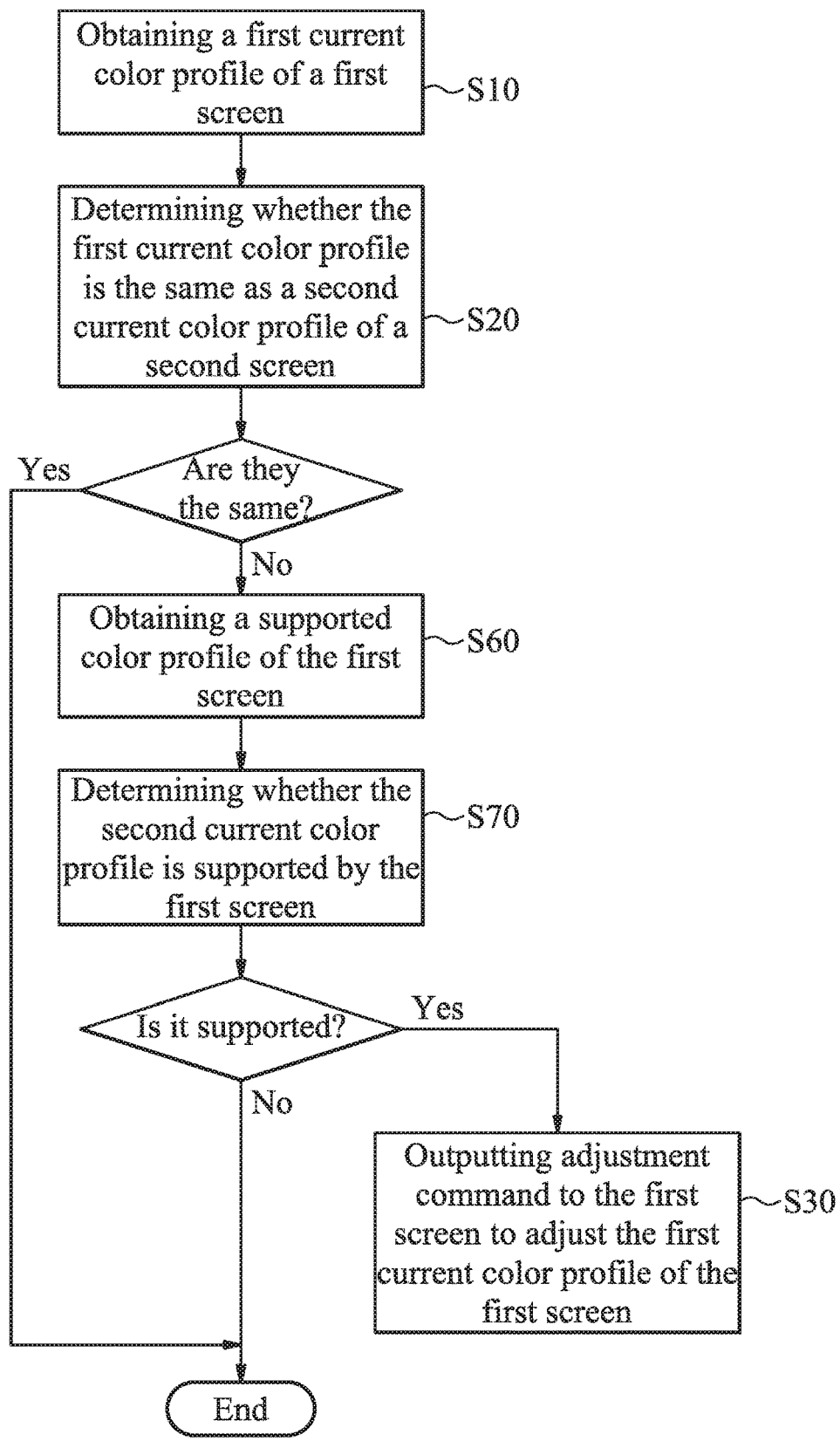
FIG. 7 is a flowchart illustrating an embodiment of the color profile adjustment method.

In some embodiments, only when the processing module 130 in step S20 has determined that the first current color profile of the first screen 200 is different than the second current color profile of the second screen 120 and also the processing module 130 in step S70 has determined that the first screen 200 can support the second current color profile, the processing module 130 performs step S30 to output the adjustment command. It should be noted that the execution sequence of step S10 and step S60 may be swapped. Alternatively, as shown in FIG. 7, the processing module 130 may firstly perform step S10 and step S20, and the processing module 130 then continues to perform step S60 and step S70 when determines in step S20 that the first current color profile of the first screen 200 is different than the second current color profile of the second screen 120. However, the present invention is not limited thereto. It should be noted that although step S40, step S51, and step S52 are not shown in FIG. 7, step S40, step S51, and step S52 may be combined into the flow shown in FIG. 7.

Figure 8:
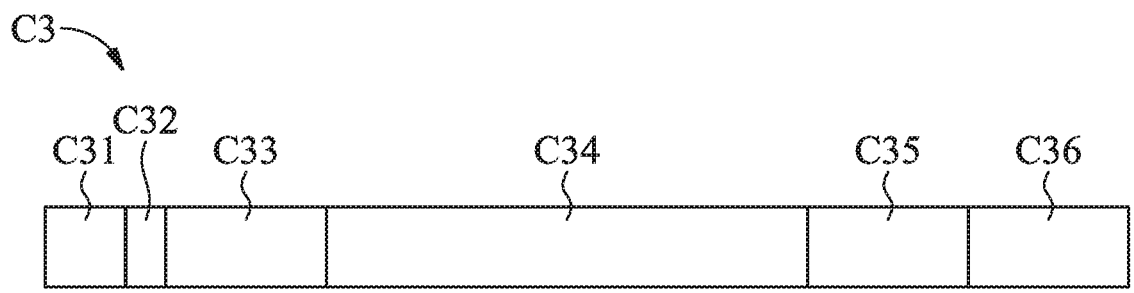
FIG. 8 is a schematic diagram illustrating an embodiment of a command format to obtain a current color profile.

FIG. 8 is a schematic diagram illustrating an embodiment of a command format to obtain the current color profile. In an embodiment, an example of command C3 issued by the processing module 130 in step S10 through the control program A1 may as shown in FIG. 8. Herein, the command C3 may include a plurality of command segments C31-C36 which are sequentially connected. Wherein, the functions of command segments C31-C36 of command C3 are roughly the same as the command segments C11-C16 of command C1, but the value of the command segment C31 herein may be, such as 1, to indicate this command C3 is used to obtain a current color profile.

Figure 9:
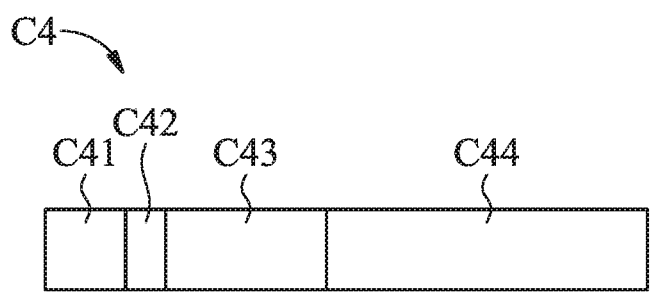
FIG. 9 is a schematic diagram illustrating an embodiment of a command format to respond for the current color profile.

FIG. 9 is a schematic diagram illustrating an embodiment of a command format to respond for the current color profile. In an embodiment, an example of a command C4 responded by the control program B1 after receiving and executing the command C3 may as shown in FIG. 9. Herein, the command C4 may include a plurality of command segments C41-C44 which are sequentially connected. Wherein, the functions of command segments C41-C43 of command C4 are roughly the same as the command segments C21-C23 of command C2. Each bit in the command segment C44 represents to different color profile. For example, the command segment C44 may be "00000010", wherein the bit whose value is "1" may represents to sRGB, i.e., the current color profile of the first screen 200 is sRGB.

Please refer to FIG. 2 (or FIG. 3, FIG. 4, FIG. 7 or FIGS. 12A and 12B). In an embodiment of step S30, the processing module 130 can directly generate the adjustment command through the control program A1 and output it to the control program B1 of the first screen 200 through the connection port, so that the control program B1 can adjust the first current color profile of the first screen 200 to a color profile consistent with the second current color profile of the second screen 120 according to the adjustment command. For example, when the second current color profile of the second screen 120 is AdobeRGB and the first current color profile of the first screen 200 is sRGB, the control program B1 can adjust the first current color profile of the first screen 200 to AdobeRGB according to the adjustment command. However, the present invention is not limited thereto.

Figure 10:
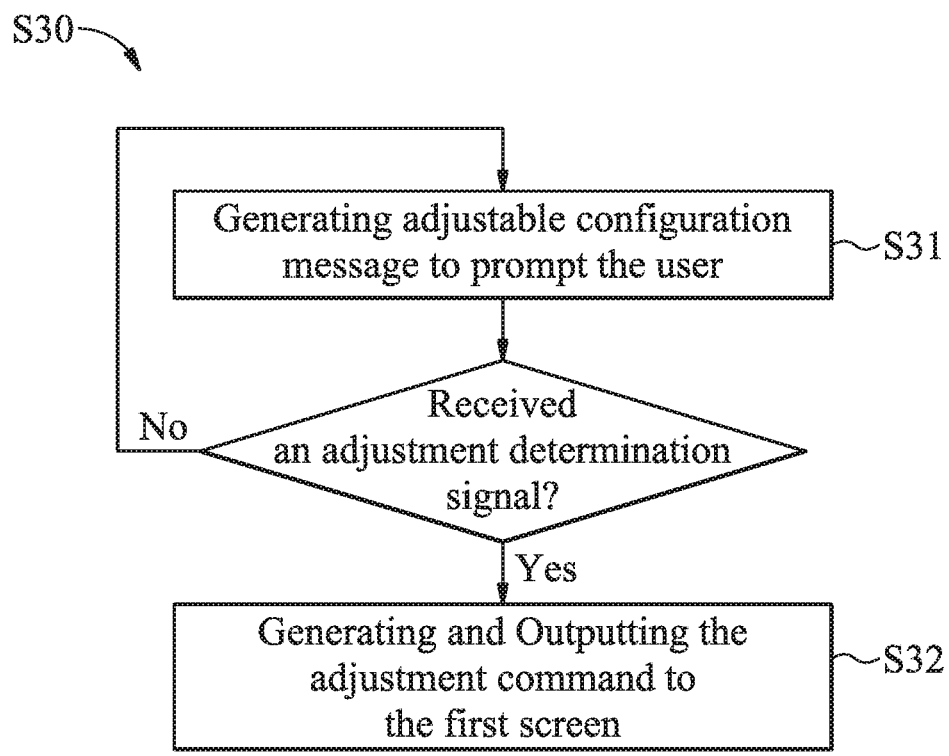
FIG. 10 is a flowchart illustrating an embodiment of step S30.

FIG. 10 is a flowchart illustrating an embodiment of step S30. Please refer to FIG. 10. In another embodiment of step S30, the processing module 130 can first generate an adjustable configuration message through the control program A1 to prompt the user (step S31). After that, when the control program A1 receiving an adjustment determination signal generated through the electronic device 100 by the user, the processing module 130 generates and outputs the adjustment command through the control program A1 to the control program B1 of the first screen 200 (step S32), so that the control program B1 automatically adjusts the first current color profile of the first screen 200 to a color profile consistent with the second current color profile of the second screen 120.

In some embodiments, the control program B1 can adjust the first current color profile of the first screen 200 by a scaler, but the present invention is not limited thereto.

In some embodiments, the adjustable configuration message in step S31 can prompt the user by popping up on the display screen of the second screen 120 and/or the first screen 200, but the present invention is not limited thereto. In addition to prompt the user in a visual display manner, the adjustable configuration message can also prompt the user in other manner, such as in a hearing manner. Furthermore, the adjustment determination signal in step S32 may be generated by the user through touching, clicking the second screen 120 and/or the first screen 200, or through other input devices, such as a mouse, a touchpad, a trackball, etc.

Figure 11:
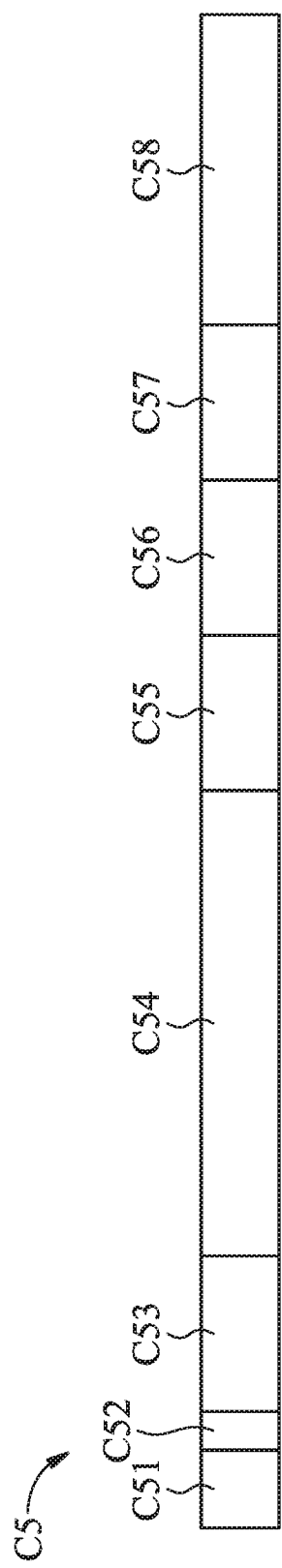
FIG. 11 is a schematic diagram illustrating an embodiment of a command format to set a new color profile.

FIG. 11 is a schematic diagram illustrating an embodiment of a command format to set a new color profile. In an embodiment, an example of an adjustment command C5 issued by the processing module 130 through the control program A1 may as shown in FIG. 11. Herein, the adjustment command C5 may include a plurality of command segments C51-C58. Wherein, the command segments C51-C56 of the adjustment command C5 are the same as the command segments C11-C16 of command C1, but the value of the command segment C51 herein may be, such as 2, to indicate this adjustment command C5 is used to set a new color profile. The command segment C57 is configured to indicate an occupied byte of the next command segment. For example, when the value of the command segment C57 is 8, this indicates that the occupied byte of the command segment C58 is 8 bytes. Furthermore, the occupied byte of the command segment C57 may be 4 bytes. The command segment C58 is configured to indicate which kind of color profile is to be set. The command segment C58 may be "10000000", and it indicates that to set the first current color profile of the first screen 200 to AdobeRGB.

In an embodiment, a command responded by the control program B1 after receiving and executing the adjustment command C5 may only include the error code which is used to indicate the execution of received command is successful, such as the command segment C21 of the command C2.

In some embodiments, the first screen 200 or the second screen 120 may have a module name which is predetermined, and the module name of the first screen 200 or the second screen 120 may be set by the manufacturers following a corresponding predetermined naming rule. Generally, the first screen 200 and the second screen 120 whose predetermined naming rules match should be screens in the same series, and when the first screen 200 and the second screen 120 adopt the same color profile to operate a display, their display color should be the same (or quite close). Although the first screen 200 and the second screen 120 whose predetermined naming rules do not match use the same color profile to operate a display, there may be an obvious color difference between the first screen 200 and the second screen 120 affected by their own configuration file or supported hardware, etc., thereby influencing user experience. Therefore, by determining whether the first screen 200 and the second screen 120 are in the same series, the processing module 130 can further ensure that the display color of the first screen 200 after color profile adjustment is the same as (or quite close to) the display color of the second screen 120, so as to improve user experience.

Figure 12A:
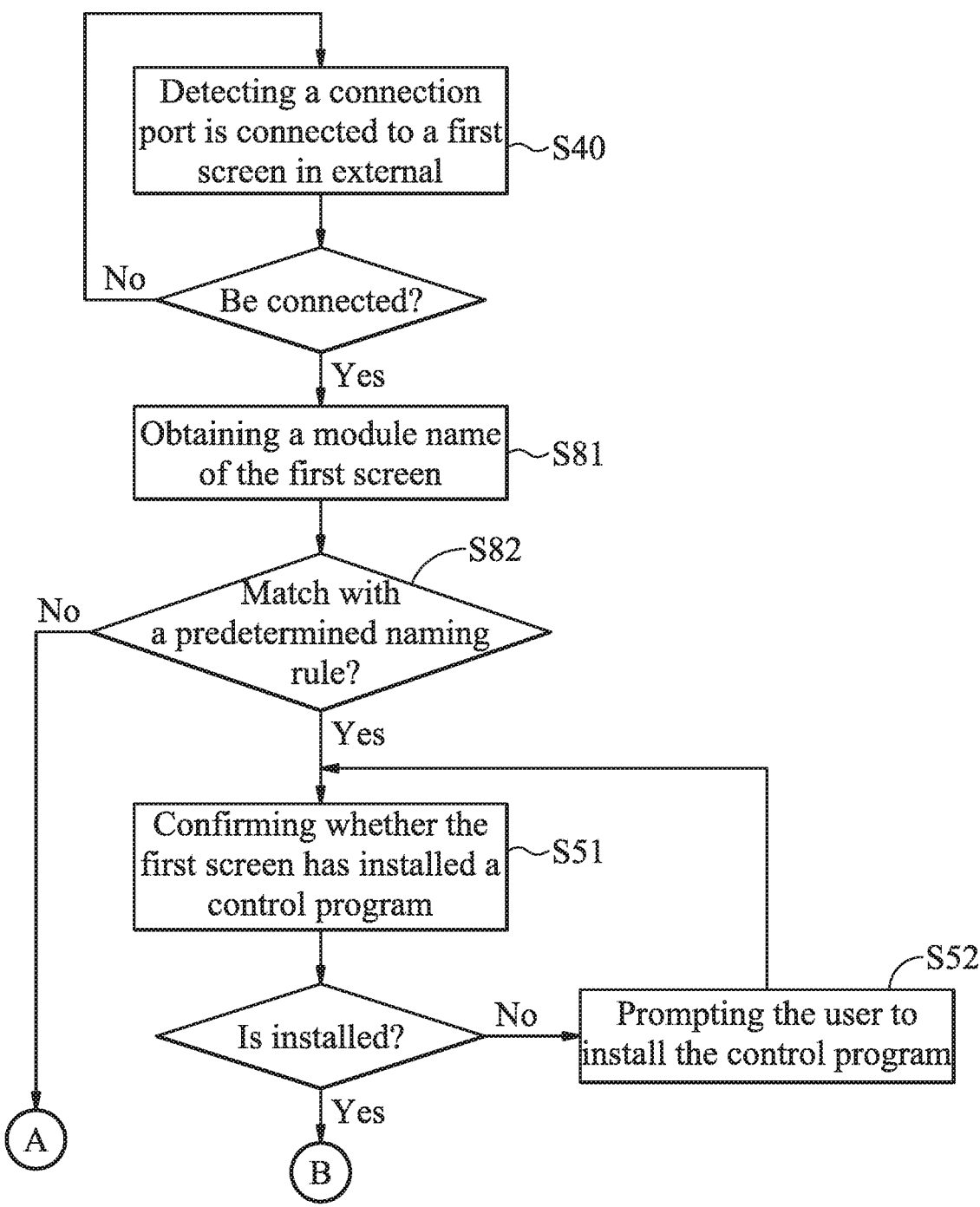
FIG. 12A and FIG. 12B are flowcharts illustrating an embodiment of the color profile adjustment method.
Figure 12B:
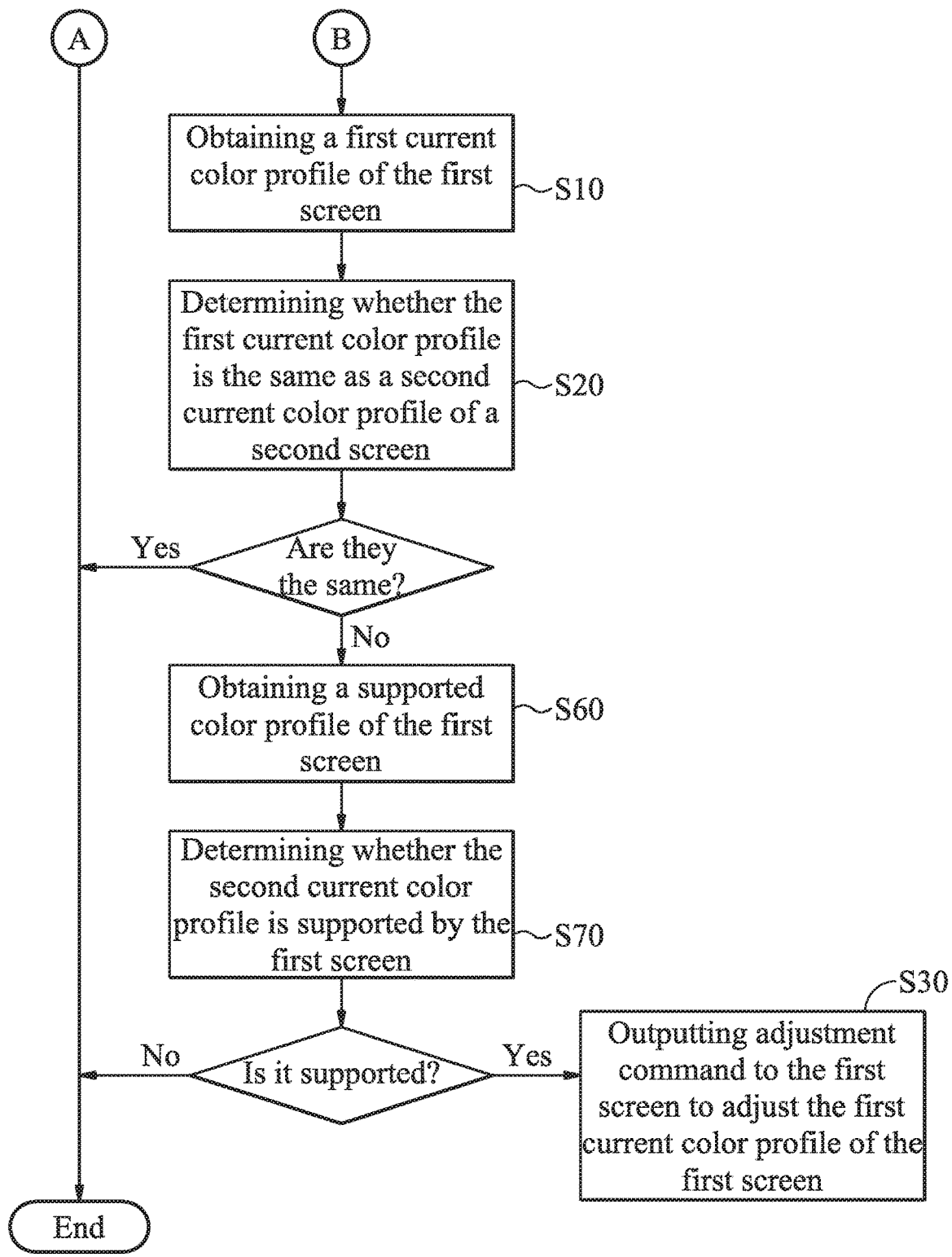

FIG. 12A and FIG. 12B are flowcharts illustrating an embodiment of the color profile adjustment method. Please refer to FIG. 1, FIG. 12A and FIG. 12B. In an embodiment of the color profile adjustment method, when the processing module 130 in step S40 detected the connection port 110 of the electronic device 100 is connected to the first screen which is external, the processing module 130 can further obtain a module name of the first screen 200 through the connection port 110 (step S81). Furthermore, the processing module 130 can determine whether the module name obtained in step S81 follows a predetermined naming rule (step S82). In some implementations, the predetermined naming rule can be a naming rule belonging to the second screen 120, but the present invention is not limited thereto.

When the determination in step S82 is that the obtained module name obeys the predetermined naming rule, this indicates that the display color of the first screen 200 externally connected to the electronic device and the second screen 120 can be the same (or quite close) under the same color profile. Accordingly, the processing module 130 can choose to continue the subsequent steps, such as step S10. In some embodiments, when the processing module 130 in step S82 determined that the obtained module name does not obey the predetermined naming rule, the processing module 130 may not continue the subsequent steps, such as step S10, but the present invention is not limited thereto.

As described above, any one embodiment of the present invention provides an color profile adjustment method and an electronic device that can compare a first current color profile of a first screen which is externally connected to the electronic device with a second current color profile of a second screen of the electronic device, and can enable the first screen to display based on the second current color profile when it is determined that the first current color profile is different than the second current color profile, so that the display color of the second screen and the first screen externally connected to the electronic device can be almost the same, thereby improve user experience.

The features of the embodiments described above will allow persons having ordinary skill in the art to clearly appreciate the form of the present specification. Persons having ordinary skill in the art will appreciate that the objectives and/or the advantages of the above embodiments can be accomplished in a way that is consistent with the above embodiments by designing or modifying other processes and structures based on the content of the present disclosure. Persons having ordinary skill in the art will also appreciate that equivalent constructions can be modified, substituted or retouched without departing from the scope and spirit of the present invention.

What is claimed is:

1. A color profile adjustment method, adapted to an electronic device, comprising:
   obtaining a first current color profile of a first screen which is externally connected to the electronic device;
   determining whether the first current color profile is the same as a second current color profile of a second screen of the electronic device; and
   when it is determined that the first current color profile is different than the second current color profile, outputting an adjustment command to the first screen, so that the first screen adjusts the first current color profile according to the adjustment command; and
   obtaining a supported color profile of the first screen; and
   determining whether the first screen supports the second current color profile according to the supported color profile;
   wherein, the step of outputting the adjustment command to the first screen is performed when it is determined that the first screen supports the second current color profile and that the first current color profile is different than the second current color profile.

2. The color profile adjustment method as claimed in claim 1, wherein before the step of obtaining the first current color profile which is externally connected to the electronic device, the color profile adjustment method further comprises:

detecting whether the first screen is externally connected to the electronic device.

3. The color profile adjustment method as claimed in claim 1, wherein the step of outputting the adjustment command to the first screen comprises:

generating an adjustable configuration message to prompt a user; and after receiving an adjustment determination signal, outputting the adjustment command to the first screen, wherein the adjustment determination signal is generated by the user through the electronic device.

4. The color profile adjustment method as claimed in claim 2, further comprising:

when it is detected that the first screen is externally connected to the electronic device, obtaining a module name of the first screen; and determining whether the module name follows a predetermined naming rule;

wherein, the step of obtaining the first current color profile of the first screen which is externally connected to the electronic device is performed after determining that the module name does not follow the predetermined naming rule.

5. An electronic device, comprising:

a connection port, configured to connect to a first screen in the external of the electronic device;

a second screen; and a processing module, configured to obtain a first current color profile of the first screen when the first screen is externally connected to the connection port, and to determine whether the first current color profile is the same as a second current color profile of the second screen, wherein when it is determined that the first current color profile is different than the second current color profile, the processing module outputs an adjustment command to the first screen through the connection port, so that the first screen adjusts the first current color profile according to the adjustment command;

wherein when the first screen is externally connected to the connection port, the processing module further obtains a supported color profile of the first screen, and determines whether the first screen supports the second current color profile according to the supported color profile, wherein the processing module outputs the adjustment command to the first screen through the connection port when it is determined that the first screen supports the second current color profile and that the first current color profile is different than the second current color profile.

6. The electronic device as claimed in claim 5, wherein the processing module further detects whether the first screen is externally connected to the connection port.

7. The electronic device as claimed in claim 5, wherein when it is determined that the first current color profile is different than the second current color profile, the processing module first generates an adjustable configuration message to prompt a user, and outputs the adjustment command to the first screen after receiving an adjustment determination signal generated by the user through the electronic device.

8. The electronic device as claimed in claim 6, wherein when it is detected that the first screen is externally connected to the electronic device, the processing module further obtains a module name of the first screen through the connection port, and determines whether the module name follows a predetermined naming rule, wherein the processing module obtains the first current color profile of the first screen through the connection port after determining that the module name does not follow the predetermined naming rule.

\* \* \* \* \*